United States Patent [19]

Cohen et al.

[11] 4,390,861

[45] Jun. 28, 1983

[54] COCKPIT DISPLAY SYSTEM TO REDUCE VERTIGO

[75] Inventors: Edwin Cohen, Binghamton, N.Y.; Jack A. Maynard, Hallstead, Pa.

[73] Assignee: The Singer Company, Binghamton, N.Y.

[21] Appl. No.: 242,742

[22] Filed: Mar. 11, 1981

Related U.S. Application Data

[63] Continuation of Ser. No. 90,764, Nov. 2, 1979, abandoned.

[51] Int. Cl.³ ................... G08C 21/00; G08C 23/00; G06F 3/14
[52] U.S. Cl. ........................ 340/27 R; 340/27 NA; 340/365 E; 340/705; 340/706; 2/160
[58] Field of Search ............... 340/705, 706, 709, 711, 340/712, 753, 365 E, 365 S, 27 R, 27 NA; 250/201; 358/93, 103; 350/173, 174; 2/160

[56] References Cited

U.S. PATENT DOCUMENTS 3,617,627 11/1971 McLean ..................... 340/365 E
4,109,145 8/1978 Graf ............................. 340/706
4,185,281 1/1980 Silverstone ................ 340/706

Primary Examiner—James J. Groody
Attorney, Agent, or Firm—Jeff Rothenberg; Douglas M. Clarkson

[57] ABSTRACT

The disclosures gives a system for indicating visually to a pilot within his normal field of view, so that the pilot need not turn his head, both the identity of a knob or switch which the pilot's hand is touching and also the setting of that switch. The arrangement prevents spatial disorientation, or pilot's "vertigo", by informing the pilot the identity as well as the present setting of a switch located remotely in his cockpit, outside of his normal field of view, without the pilot having to turn his head to look at the switch.

6 Claims, 9 Drawing Figures

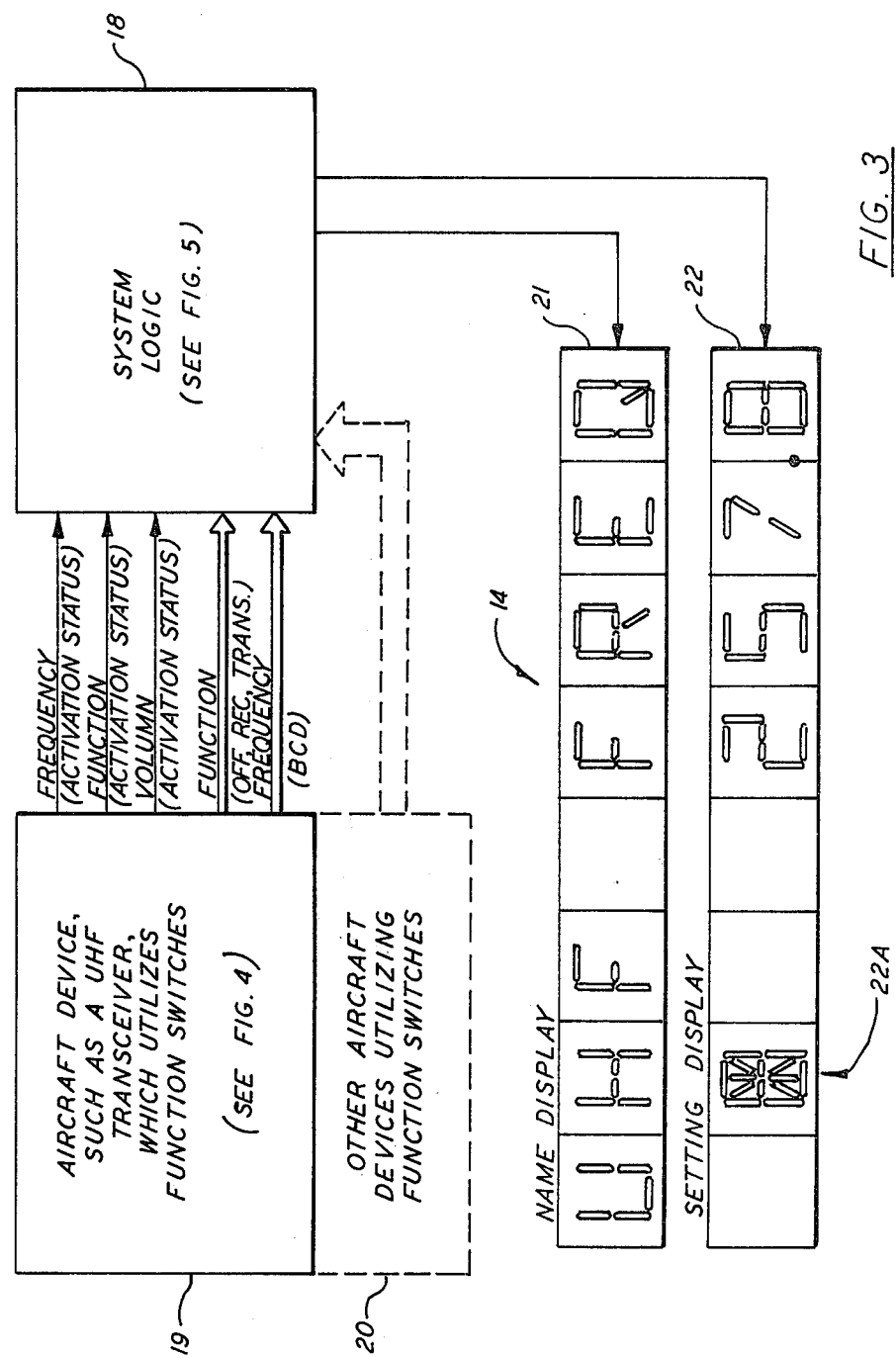

| FIG. | FIG. |
| 5A | 5B |

COCKPIT DISPLAY SYSTEM TO REDUCE VERTIGO

This is a continuation of application Ser. No. 090,764, filed Nov. 2, 1979 now abandoned.

BACKGROUND OF THE INVENTION

1. Field of the Invention

This invention, generally, relates to aircraft systems in which a pilot must function and, more particularly, to a new and improved system to provide information to a pilot under conditions that do not require the pilot to move his eyes from his normal field of vision.

The problem relating to spatial disorientation in normal operational flight that are faced by a pilot are well recognized today. Many studies indicate that a pilot's "vertigo" is a significant factor in the cause of accidents and particularly so during flight training.

During training, every possible effort is made today to eliminate spatial disorientation as a cause of attrition. A student pilot is indoctrinated very early in training regarding the psychological and physiological reactions experienced relative to orientation in space under varying flight conditions.

Although pilot's "vertigo" is a condition experienced universally by all pilots, tests, surveys and other studies made in this area indicate that "vertigo" is a condition not universally acknowledged by all pilots. Most pilots have innumerable "vertigo" experiences of either mild, moderate or severe degrees.

The recorded experiences show that "vertigo" incidence occur under all types of circumstances. Of the approximately dozen factors contributing to "vertigo" experiences, the disturbing effects caused by head movement during flight conditions was by far the most often repeated cause factor.

It seems that a majority of pilots consider either no problem exists or that if "vertigo" is a problem, there is little anyone can do about it. Of those who apparently consider pilot's "vertigo" to be a problem, the majority believe that practice and training are the essential means of solution.

As used herein, "spatial disorientation", or pilot's "vertigo", is defined as a state of confusion concerning a pilot's true position in space. The term "field of vision (or view)" is intended to encompass a wider angle than that of a "line of sight".

It is now accepted universally by aerospace physicians that aerial orientation can be maintained only by means of the visual sense reference to instruments inside the aircraft or to outside references. Therefore, it is acknowledged readily by flight physicians that the eyes are a main source of reliable information during flight.

The "Coriolis" illusion is the rather bazaar sensation of climbing, diving and pitching as a result of turning of the pilot's head to focus his eyes while the aircraft is in a sharp turn or spin and is the result of two distinct rotary forces acting on the vestibular apparatus at the same time.

This "vestibular" confusion is caused by two distinct rotary forces acting on the semi-circular canals at the same time, the magnitude and direction of which are predictable. For example, if the pilot's aircraft is rotating to the right and he tilts his head to the right, a false sensation of climbing will result. Conversely, if while in right rotation, the pilot tilts his head to the left, a false sensation of diving will occur. This illusion has been the cause of a significant number of fatal accidents.

Now that the problem and its cause are understood more fully, the number of answers suggested approximate the number of flight surgeons in the United States Air Force. The answers that have been proposed, usually involve a training program of one type or another, and the only apparatus changes that have been proposed heretofore involve what has been termed a "head-up display".

Some changes in the art and science of flying have resulted directly from studies of spatial disorientation accident trends. For example, manufacturers now are aware of the problem associated with placing radio-frequency selector knobs in positions where the pilot has to turn his head to change frequencies, and modern aircraft have such knobs placed so that no extreme head movement is required to operate them.

However, there is a limit to the number of radio and other knobs that can be appropriately positioned, and with the increasing complexity of the art and science of flying, the number of such knob adjustments have increased dramatically. Moreover, in smaller cockpits, such as fighter planes, the space available for locating such knobs is limited even further.

The present day cockpit design contributes to spatial disorientation (or pilot's "vertigo") in at least two ways:
1. The requirement to turn the pilot's head in order to see controls or indicators located on a side console can produce "Coriolis" effects.
2. Any diversion of vision away from the attitude indicators on the main instrument panel removes the pilot from the best preventative of disorientation: i.e., use of attitude instruments, and it may take the pilot well over a second to get his eyes focused again on instruments after such diversion of his vision.

No additional display hardware would be required in those aircraft having suitable cathode ray tubes (CRT), a portion of whose display area could be time-shared for the purpose of the present invention, to be described in more detail presently.

The proposed system, in accordance with the invention, involves a minimum of cockpit rearrangement, and is fail safe. For example, if the identity and/or the setting of a knob does not get displayed, because of the failure of the proximity sensor, or because of the failure of the display itself or because of the failure of some other system component, the pilot can accomplish his purpose by turning his head and looking at the control, exactly as he does now.

2. Description of Prior Art

While it is believed that the particular solution to the problem described above has not been proposed by any prior art, the closest dealing with this subject matter generally relates to "head-up displays", of which U.S. Pat. No. 4,153,913 is somewhat representative. In this patent, there is disclosed a cathode ray tube (CRT) mounted on a helmet worn by the pilot in which the light from the display image is superimposed on the outside scene by means of a combiner plate.

U.S. Pat. No. 3,737,212 positions the cathode ray tube to project the image from the rear of the combining element for better space utilization. However, as stated previously, none of the known prior art even suggests the solution to this problem as presented by the present invention.

SUMMARY OF THE INVENTION

It is an object of the invention to present a new and greatly improved apparatus change to provide information to a pilot under conditions that require the pilot to move his eyes only a minimum amount to look at a display well within his normal field of view.

A system for preventing spatial disorientation (or pilot's "vertigo"), constructed in accordance with the principles of the present invention, contemplates the use of a suitable display located within, or contiguous to, a pilot's normal field of view. The display reveals immediately to the pilot the identity of the particular remote cockpit control his hand is touching and also the position or setting of that control, without the necessity of the pilot's eyes being taken from his normal field of view.

While the particular display selected can be an existing display device already mounted in the cockpit and which is time-shared with other functions, it could be a new CRT display, or alternatively, it could be a new alpha-numeric display device. The particular control being touched is sensed by a suitable proximity sensor, such as a magnetic or capacitance switch, or by an auxiliary microswitch built into the control knob, and once the remote cockpit control knob is sensed as being touched, the display indicates both the identity of the control and the setting.

DESCRIPTION OF THE DRAWINGS

The foregoing, other and further objects, features and advantages will appear more fully from the detailed description of the presently preferred embodiment of the invention and from the appended claims, both viewed in conjunction with the accompanying drawings, where:

FIG. 3 is a schematic block diagram to illustrate the presently preferred form of the invention.

PRESENTLY PREFERRED EMBODIMENT

Figure 1:
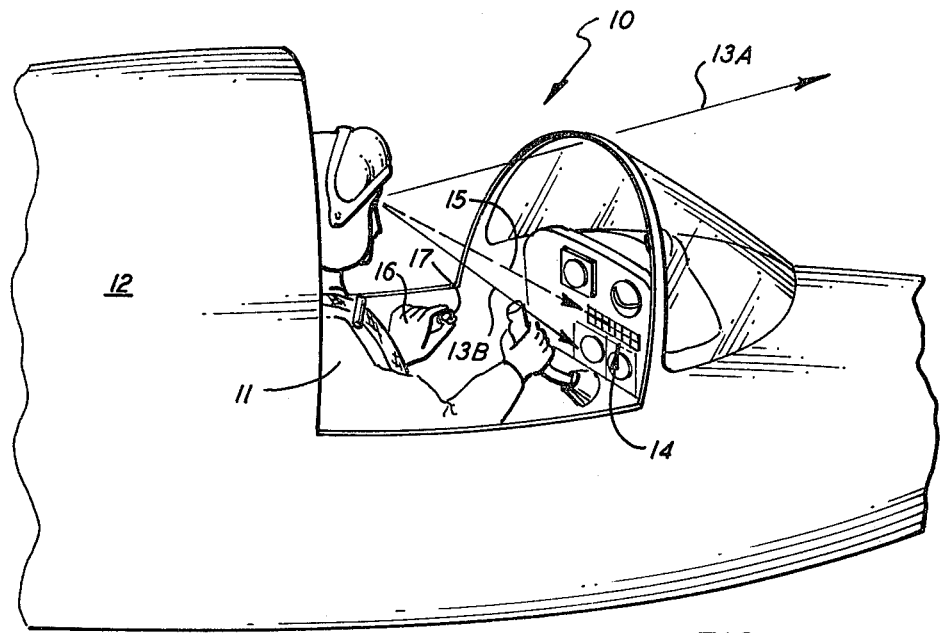
FIG. 1 is a diagrammatic illustration of the cockpit of a high speed aircraft showing the placement of the visual display and the function switches for operating the display, in accordance with the invention.

The same reference numerals will be used throughout the various figures of the drawings to identify the same or corresponding component parts.

Figure 2:
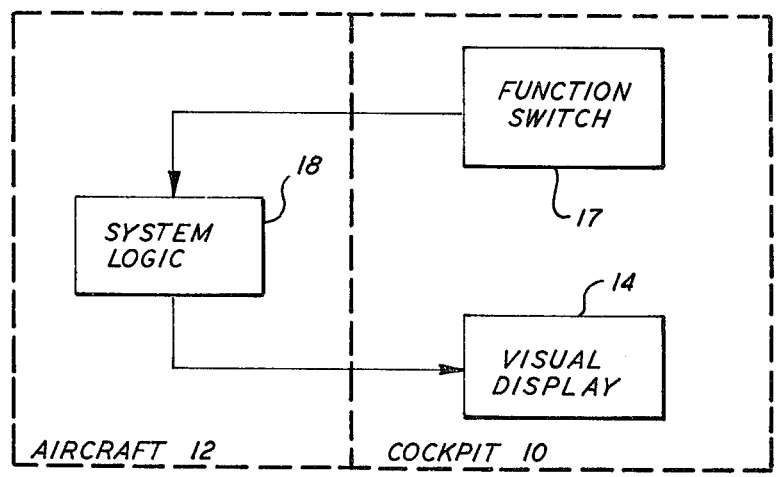
FIG. 2 is a block diagram to illustrate the system configuration in accordance with the invention.

Referring now to FIGS. 1 and 2 of the drawings, the numeral 10 identifies the cockpit of a high speed aerial vehicle, such as a fighter plane or a form of commercial plane in which a pilot 11 is depicted somewhat diagrammatically. While only the cockpit is intended to be identified by the reference numeral 10, it is part of an overall vehicle 12.

The pilot 11 has a normal field of view, indicated generally by the included angle between arrows 13A and 13B, and a visual display is identified within the cockpit 10 by the reference numeral 14. For maximum anti-vertigo benefit to the pilot 11, it is contemplated that the visual display 14 is located contiguous with the aircraft attitude instruments. As illustrated particularly in FIG. 1, the pilot 11 may view the visual display 14 along a line of sight indicated by the broken line 15, which is generally within his normal field of view 13A-13B.

When the pilot 11, with one of his hands 16, touches a function switch 17, as illustrated in FIG. 1, the identity and the setting of the switch is depicted on the visual display 14. The location of the function switch 17 is on a console to one side of the cockpit 10, and therefore, while in the immediate presence of the pilot 11, the function switch 17 is located away from his normal line of sight 13.

In FIG. 2 of the drawings, the visual display 14 as well as the function switch 17 are illustrated as being within the cockpit 10. However, a system logic circuit, indicated generally by the reference numeral 18, can be located in any convenient part of the aircraft 12, including the cockpit 10.

Referring to FIG. 3 of the drawings, the particular aircraft device which utilizes the function switch 17 is an Ultra High Frequency (UHF) communication transceiver 19. For the purposes of this illustration, three functions are selected on the UHF transceiver 19, and these are: a frequency adjusting switch, a function selection switch (such as off, receive, transmit, transmit/receive, test, etc.) and a volume control. Each of these functions is equipped with an appropriate function switch, i.e., either FIG. 4A or FIG. 4B, to be described in more detail presently. The particular visual display 14 includes two similar devices identified by the numerals 21 and 22, the device 21 being for the purpose of displaying the name of the instrument knob actuated by the touch of the pilot's hand 16 and the device 22 being the display of the setting for the instrument knob identified by the device 21.

Each one of the display devices 21 and 22 can be any convenient type, it presently being preferred to utilize a 14 segment LED (Light Emitting Diode) character display made by Burroughs and identified as a Panaplex panel display. One diode 22A is illustrated as having all 14 of its segments illuminated, and the other diodes in use for the particular description are drawn to illustrate those segments to show specific information.

As pointed out previously, the name display device 21 and the setting display device 22 are both energized as soon as the pilot touches a particular knob 17.

Figure 4B:
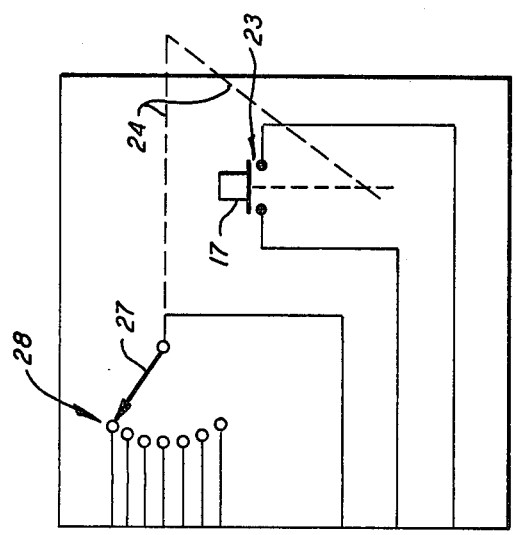
FIG. 4A and FIG. 4B is a schematic diagram in diagrammatic form of two embodiments of the function switch in accordance with the invention.
Figure 4A:
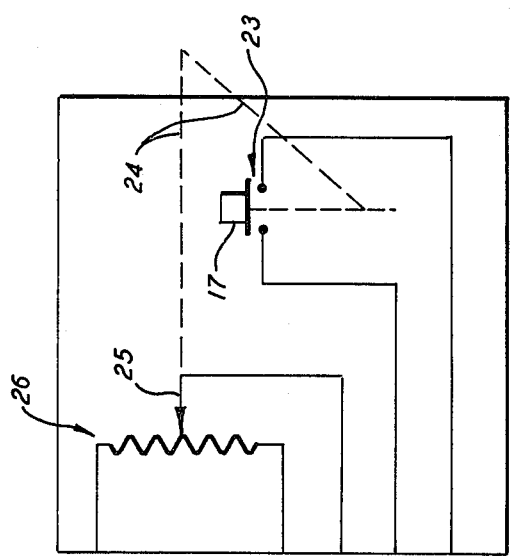

Referring now more particularly to FIG. 4A of the drawings, the control knob of the function switch 17 is shown attached as an integral part with a snap-acting microswitch identified generally by the numeral 23. The broken lines 24 indicate that the shaft of the knob for the switch 17 and the microswitch 23 is connected directly with a moveable contact 25 to actuate a potentiometer circuit 26.

In FIG. 4B, the knob of the switch 17 actuates a microswitch 23 and is connected also to a rotary switch element 27, as indicated by the broken lines 24. The rotary switch element 27 makes discrete contact with terminals indicated by the numeral 28.

Controls such as the rotary switch and potentiometers, with auxiliary micro-switches, shown in FIGS. 4A and 4B, are presently available commercially from Janco Corporation, of Burbank, California. However, it should be understood that other forms of electrical switches are applicable to the present invention.

Selection of the control or knob to be identified on the display can be made by proximity sensors (such as used for some passenger elevator buttons), and such sensors can be located either adjacent each control or knob that is to be identified and adusted in accordance with the invention or as an integral part of such control or knob. Capacitance sensing, magnetic sensing (using small magnets embedded in the pilot's gloves) or other sensing means can be used also.

The position and activation status of the control knob of all aircraft devices employing the invention are inputs to the system logic circuit 18. The identity and the setting of the activated control knob are produced by the system logic circuit 18 for display via the visual display 14.

As an illustration, if the pilot 11 were to touch the frequency selection control knob of the function switch 17 on the UHF transceiver 19, "UHF FREQ" would light up in the name display device 21, and a frequency, such as "257.8", for example, would light up in the setting display device 22. As long as the pilot keeps his hand on the control knob of the switch 17, the name and present setting will be displayed. As the pilot 11 changes the control setting, the display would update to indicate the new setting.

Figures 5, 5B:
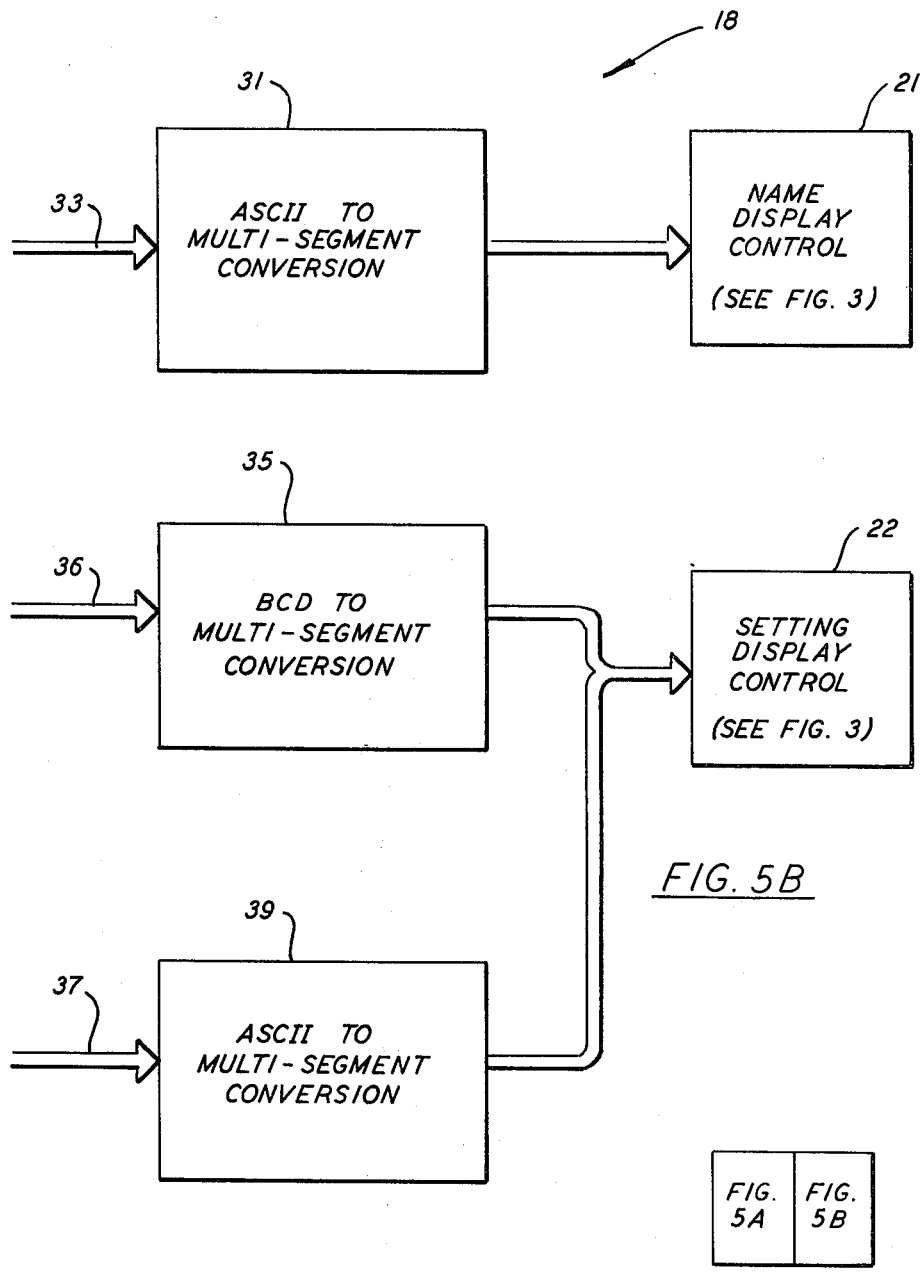
FIG. 5 is a block diagram of the system logic to illustrate the operation of the invention and consists of two sheets with FIG. 5A and FIG. 5B.
Figure 5A:
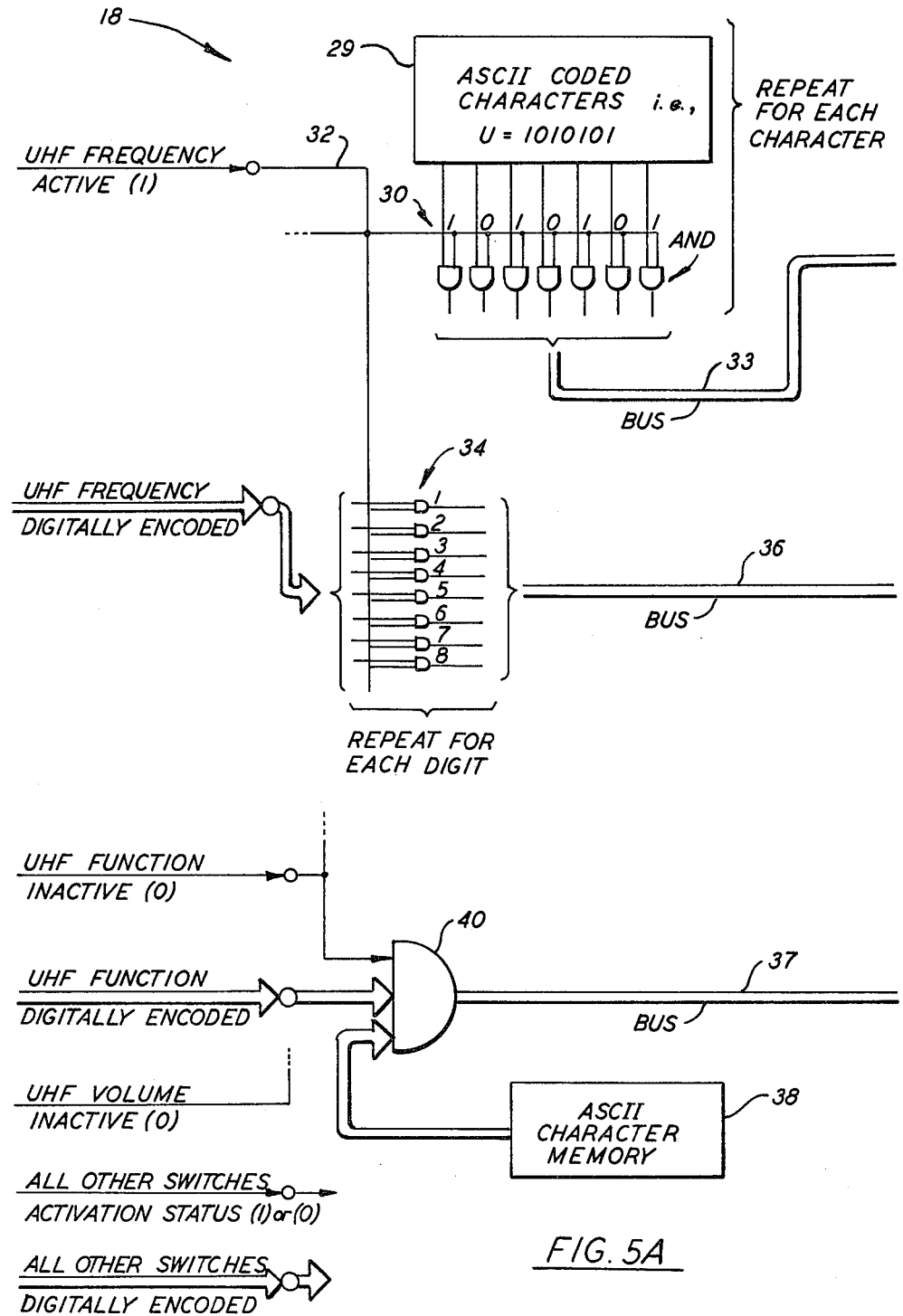

In FIG. 5, the system logic circuit 18 is a unique configuration of standard digital electronics components. The function switch 17 of the transceiver 19 provides a logic signal input to the system logic circuit 18. These logic signals are used to gate the proper displays to both the name display device 21 and the setting display device 22.

If more than one function switch is activated simultaneously, no protection or priority selection circuit is necessary, since multiple simultaneous activations produce only non-damaging "gibberish" displays. However, a priority selection circuit is included in the presently preferred form of the invention and will be described in more detail presently.

The system logic for the name display device 21 consists of an American Standard Code for Information Interchange (ASCII) encoded characters circuit 29 for the name, a gating logic circuit 30 to select the correct name, and ASCII to multi-segment display conversion circuit 31. When a control, such as "UHF Frequency", is activated over a bus line 32, the gating logic circuit 30 "enables" the appropriate AND gates in order to connect the corresponding ASCII encoded characters from the circuit 29, onto the name display bus lines 33. The ASCII-to-multi-segment conversion circuit 31 then converts the characters received on the bus lines 33 into suitable signals to drive the appropriate segments in the Light Emitting Diode Display device 21.

The system logic for controlling the setting display 22 includes the same signals on the bus line 32 selecting, by AND gates 34, the correct Binary Coded Decimal (BCD) encoded input signals from the function switch 19 and the BCD-to-multi-segment display conversion circuit 35. When an instrument, such as "UHF FREQ", is activated from a touch by the pilot, the signal on the bus 32 gates the corresponding BCD encoded characters (such as "257.8") onto the setting display bus line 36. The BCD-to-multi-segment conversion circuit 35, then, converts the characters into suitable signals to drive the multi-segment setting display 22.

In the case of a function selection control knob being touched by the pilot, such as UHF function, "UHF FUNC" would appear in the name display 21. In this instance, the setting display 22 would display a legend such as: "OFF", "RECV", "T/R", etc., using ASCII encoded character memory circuit 38, ASCII-To-Multi-segment conversion circuit 39 and logic gating circuits 40 in the same manner as the name display.

Figure 6:
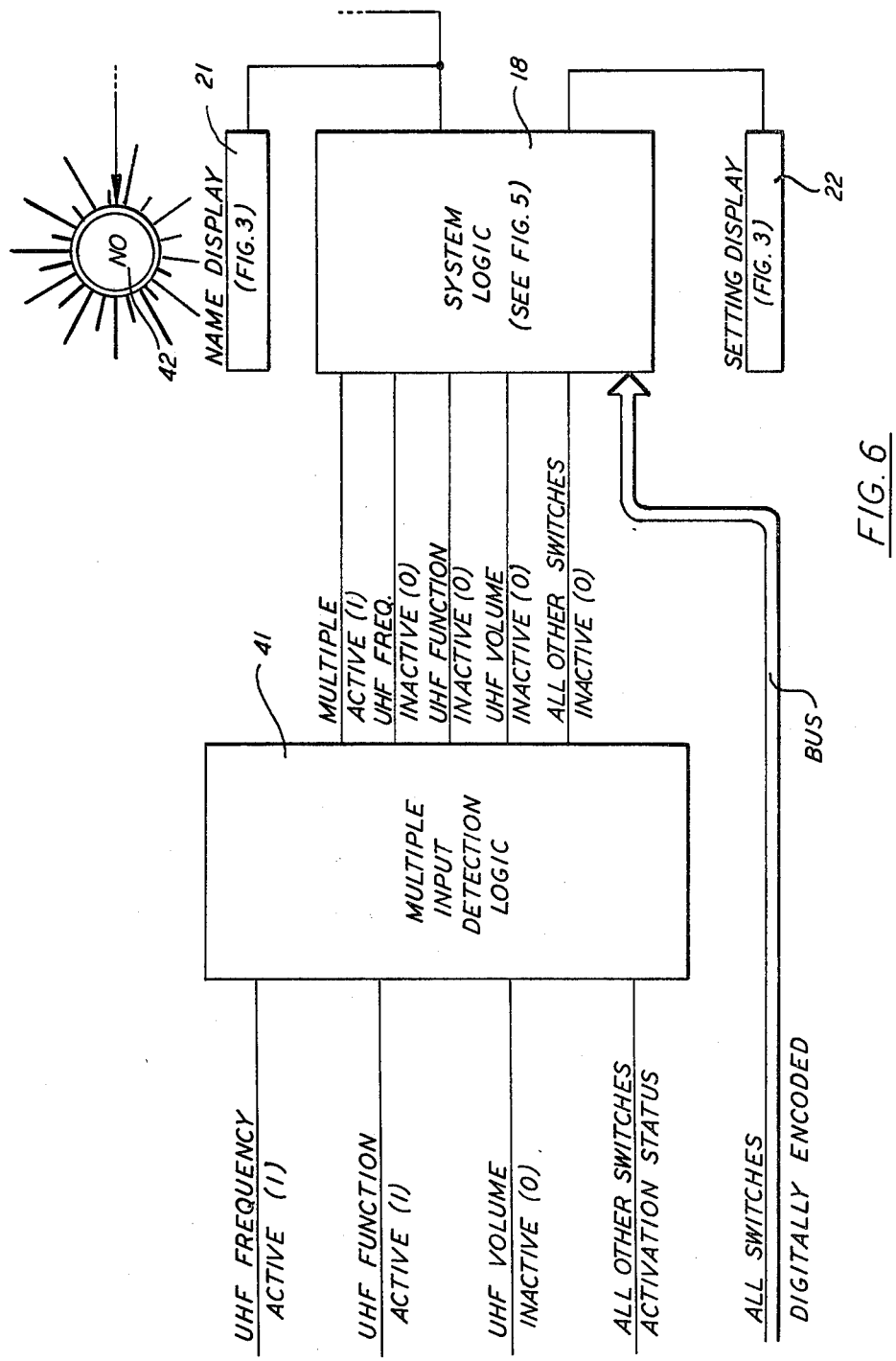
FIG. 6 illustrates detection logic in the event that more than one function switch is activated at the same time.

In FIG. 6 of the drawings, a circuit arrangement is shown for selecting priority of input signals, or more specifically, to indicate when two or more function switches are depressed simultaneously. While this is called a "priority selection circuit", perhaps a better name for it would be a "multiple input detection circuit".

By this arrangement, a detection logic circuit 41 receives the signal from each of the function switches before the signals are applied to the system logic circuit, in FIG. 5, and these signals are indicated by the single solid lines in FIG. 5. By the same legends as used previously in the other figures of these drawings, i.e., the activation status being indicated by "active (1)" or "inactive (0)", in FIG. 6 the UHF FREQUENCY switch has been depressed simultaneously with the UHF FUNCTION switch. However, the UHF VOLUME switch has not been depressed, because it is indicated as being "inactive (0)".

The multiple input detection logic circuit 41 is a simple arrangement of various gates, well within the purview of one skilled in this art, to emit a signal over the "multiple active (1)" output terminal whenever there is more than one input and, at the same time, inhibiting an output signal from the other output terminals. Therefore, because there are multiple input signals in the present illustration, the only output signal is on the "multiple" terminal.

As indicated further in FIG. 6, the respective output terminals from the detection logic circuit 41 are coupled directly into the system logic circuit 18 where the only difference in the use of a detection logic circuit 41 as illustrated here from the previous illustration is that the "multiple" terminal signal is coupled also into the system logic circuit 18 where it would have its own circuits 29 and 31 repeated for each of the desired characters to be indicated.

For an example, the word "MULTIPLE" could be coded and stored in separate circuits 29 for display as an output from the circuit 18 on the name display 21 if desired, or alternatively, a light 42 can be connected to illuminate upon receipt of a signal from the "multiple" terminal. In some instances, it may be undesirable to have the name display 21 merely inoperative when the function switch 17 is activated because the pilot may be touching a switch which, if operated, could produce undesired results.

With this arrangement just described above, all switches that are digitally encoded would bypass the multiple input detection logic circuit 41 as indicated in FIG. 6. These switches are illustrated in FIG. 5 with the double line "bus" indication.

Although the invention has been described using gates and other specifically identified circuit components, it may also be practiced by using the logic elements in a digital computer along with proper programs. The functions disclosed may also be provided to the disclosed embodiment from a computer. Therefore, it will be apparent to one skilled in this art that other and different circuit arrangements may be utilized and developed and that any number of possible combinations of computer logic and hardware are possible without deviating from the true spirit and scope of the present invention which is intended to be defined by the appended claims.

What is claimed is:

1. An anti-vertigo cockpit display system for preventing spatial disorientation by indicating, within a pilot's normal field of view, the identity and the setting of a plurality of predetermined functions controlled by separate control switch means located out of the pilot's normal field of view, comprising:

a single display means, for displaying a selected one of the functions, located within the pilot's normal field of view so that it may be viewed without it being necessary to turn the pilot's head, the control switch means each having a single knob located out of the pilot's normal field of view, system logic circuit means connected with each of said single knobs to energize said display means when a selected single knob is touched by the pilot's hand, said display means being adapted to reveal both the entire present setting and the identity of the function connected with said selected single knob, so that said pilot is informed without moving his eyes from his normal field of view, and so that said present setting can be altered by adjusting said single knob of said control switch means.

2. An anti-vertigo cockpit display system as set forth in claim 1 wherein said display means includes separate display devices, one for said identity of the predetermined function and the other for the present setting of said function.

3. An anti-vertigo cockpit display system as set forth in claim 1 in which said system logic circuit means includes an information interchange means to maintain coded characters for identifying each of predetermined functions by said display means.

4. An anti-vertigo cockpit display system as set forth in claim 3 wherein said system logic circuit means includes selection means having means to match information encoded with desired information so that only meaningful information is selected and displayed.

5. An anti-vertigo cockpit display system as set forth in claim 4 wherein said selection means includes a plurality of AND gates, and decoding conversion means to match said coded characters of said information interchange means to said display means.

6. An anti-vertigo cockpit display system as set forth in claim 5 including separate decoding conversion means to match selected encoded information to a setting display part of said display means.

* * * * *